(12) United States Patent
Tanaka (10) Patent No.: US 8,749,849 B2
(45) Date of Patent: Jun. 10, 2014

(54) CORRECTION APPARATUS, IMAGE FORMING APPARATUS, IMAGE FORMING SYSTEM, AND COMPUTER READABLE MEDIUM

(75) Inventor: Satoshi Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 135 days.

(21) Appl. No.: 13/367,115

(22) Filed: Feb. 6, 2012

(65) Prior Publication Data

US 2013/0016371 A1  Jan. 17, 2013

(30) Foreign Application Priority Data

Jul. 14, 2011 (JP) ................................. 2011-156036

(51) Int. Cl.
*H04N 1/40* (2006.01)
(52) U.S. Cl.
USPC ........... 358/3.1; 358/3.21; 358/3.26; 382/275
(58) Field of Classification Search
USPC ......... 358/3.1–3.13, 1.9, 2.1, 3.21, 3.26, 406, 358/504, 468; 382/169, 273–275
See application file for complete search history.

(56) References Cited

U.S. PATENT DOCUMENTS

| 5,841,899 | A | * | 11/1998 | Ide et al. ........................ 382/168 |
| 6,330,050 | B1 | * | 12/2001 | Takahashi et al. .............. 355/25 |
| 8,126,264 | B2 | * | 2/2012 | Kaftory et al. ................. 382/165 |
| 2006/0171001 | A1 | | 8/2006 | Kitagawa et al. |

FOREIGN PATENT DOCUMENTS

| JP | 2000-324279 A | 11/2000 |
| JP | 2006-30793 A | 2/2006 |
| JP | 4105168 B2 | 4/2008 |

* cited by examiner

*Primary Examiner* — Thomas D Lee
*Assistant Examiner* — Stephen M Brinich
(74) *Attorney, Agent, or Firm* — Sughrue Mion, PLLC (57) ABSTRACT

A correction apparatus includes an operating section that operates for forming an image having a predetermined density, a calculating section that calculates a first correction amount that is used when a value of the predetermined density is to be corrected, and a correction section that corrects the predetermined density value in such a manner that the correction is performed by using the first correction amount when first identification information corresponding to an image that has been processed by the operating section before the correction performed by the correction section and second identification information corresponding to an image that is to be processed by the operating section after the correction performed by the correction section do not satisfy a predetermined condition, whereas the correction is performed by using a second correction amount that is smaller than the first correction amount, when the first and second identification information satisfy the predetermined condition.

4 Claims, 9 Drawing Sheets

TBL1

| PRINT DATA ID | PAGE NUMBER | IMAGE ID | PAPER-FEED UNIT NUMBER | TERMINAL ID |
|---|---|---|---|---|
| 0001 | 0001 | IMAGE A | 01 | C1 |
| | 0002 | IMAGE A | 01 | C1 |
| | ⋮ | ⋮ | ⋮ | ⋮ |
| | 0100 | IMAGE A | 01 | C1 |
| 0002 | 0001 | IMAGE B | 02 | C2 |
| | 0002 | IMAGE B | 02 | C2 |
| | ⋮ | ⋮ | ⋮ | ⋮ |
| | 0050 | IMAGE C | 03 | C2 |
| ⋮ | ⋮ | ⋮ | ⋮ | ⋮ |

CORRECTION APPARATUS, IMAGE FORMING APPARATUS, IMAGE FORMING SYSTEM, AND COMPUTER READABLE MEDIUM

CROSS-REFERENCE TO RELATED APPLICATIONS

This application is based on and claims priority under 35 USC 119 from Japanese Patent Application No. 2011-156036 filed Jul. 14, 2011.

BACKGROUND (i) Technical Field

The present invention relates to a correction apparatus, an image forming apparatus, an image forming system, and a computer readable medium.

(ii) Related Art

It has been known that a change in the density of images formed by electrophotographic image forming apparatuses is caused by changes that occur in the apparatuses and changes in the surrounding environments of the apparatuses. Various proposals have recently been made to suppress such a change in density.

SUMMARY

According to an aspect of the invention, there is provided a correction apparatus including an operating section that performs an operation for forming an image having a predetermined density, a calculating section that calculates a first correction amount that is a correction amount used when a value of the predetermined density is to be corrected, and a correction section that corrects the value of the predetermined density in such a manner that the correction is performed on the basis of the first correction amount when first identification information corresponding to an image that has been a target of the operation performed by the operating section before the correction performed by the correction section and second identification information corresponding to an image that is to be a target of the operation performed by the operating section after the correction performed by the correction section do not satisfy a predetermined condition, whereas the correction is performed on the basis of a second correction amount that is smaller than the first correction amount, when the first identification information and the second identification information satisfy the predetermined condition.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the invention will be described with reference to the drawings.

(1) Exemplary Embodiment

(1-1) Configuration

Figure 1:
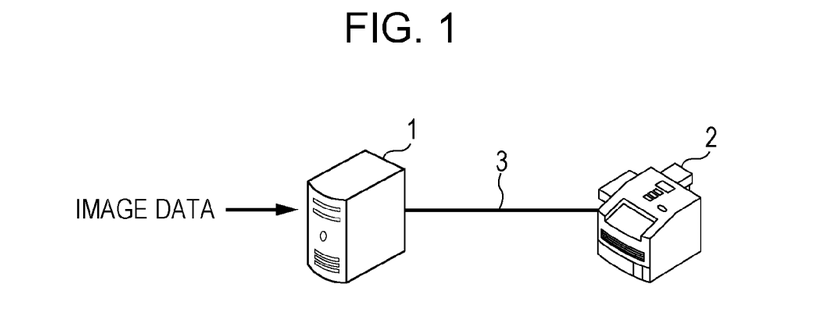
FIG. 1 is a diagram illustrating an exemplary configuration of an image forming system according to one exemplary embodiment of the invention.

FIG. 1 is a diagram illustrating an exemplary configuration of an image forming system according to one exemplary embodiment of the invention. As illustrated in FIG. 1, the image forming system includes an image processing apparatus 1 and an image forming apparatus 2. The image processing apparatus 1 receives image data from a client terminal (not illustrated), performs image processing on the image data, and transmits the resulting image data to the image forming apparatus 2. The image forming apparatus 2 receives the image data from the image processing apparatus 1, and forms an image by using an electrophotographic process in accordance with the image data. These apparatuses are connected to each other via a communication line 3, such as a local area network (LAN).

A configuration of each of the apparatuses will be described below.

Figure 2:
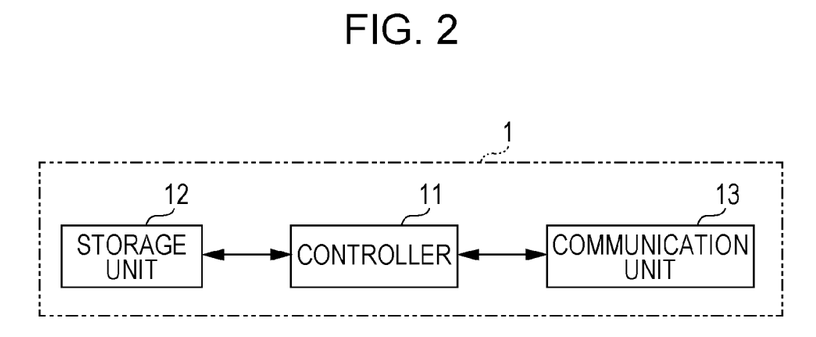
FIG. 2 is a block diagram illustrating a hardware configuration of an image processing apparatus.

FIG. 2 is a block diagram illustrating a hardware configuration of the image processing apparatus 1. As illustrated in FIG. 2, the image processing apparatus 1 includes a controller 11, a storage unit 12, and a communication unit 13. The controller 11 includes a central processing unit (CPU), a read only memory (ROM), and a random access memory (RAM). The CPU executes a program stored in the ROM or the storage unit 12 so as to control each of the units in the image processing apparatus 1. The storage unit 12 is a storage device such as a hard disk drive (HDD), and stores image data and programs, for example. The storage unit 12 also stores a print-data management table TBL1.

Figure 3:
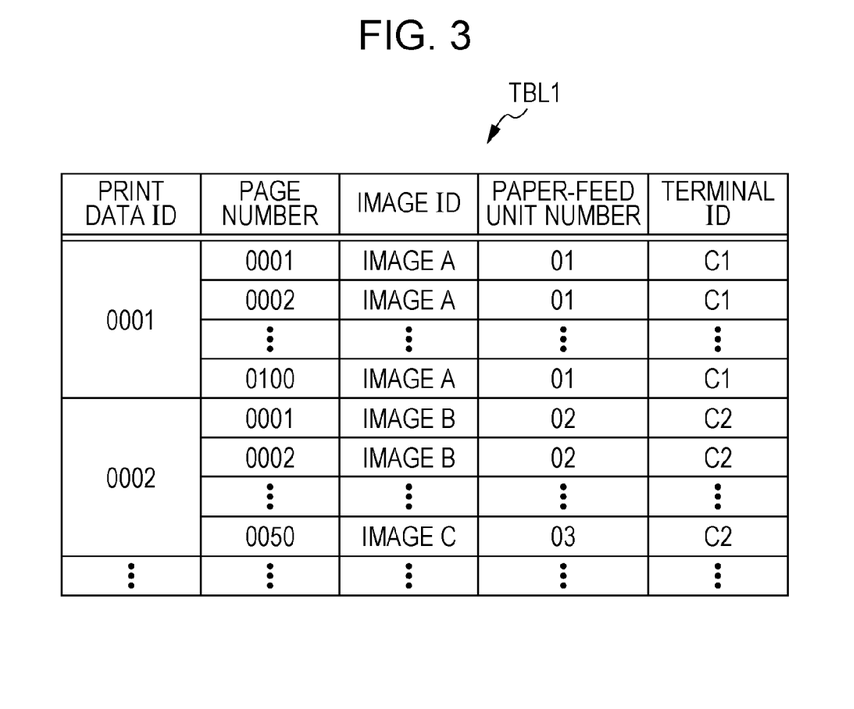
FIG. 3 is an exemplary table corresponding to a print-data management table.

FIG. 3 is an exemplary table corresponding to the print-data management table TBL1. In FIG. 3, "print data ID" represents identification information which is given to print data that is received from a client device. "Page number" represents a number for identifying each of the pages in which an image is formed in accordance with the print data. "Image ID" represents identification information of an image to be formed by an instruction in the print data. "Paper-feed unit number" represents a number for identifying a paper feed unit which stores a recording medium on which an image is to be formed by an instruction in the print data. "Terminal ID" represents identification information of a client terminal which has transmitted the print data. When the controller 11 receives print data from a client device via the communication unit 13, the controller 11 registers the above-described information on the print data (hereinafter, referred to as "print-data-related information") in the print-data management table TBL1.

The communication unit 13 includes an interface card so as to communicate with external apparatuses.

Figure 4:
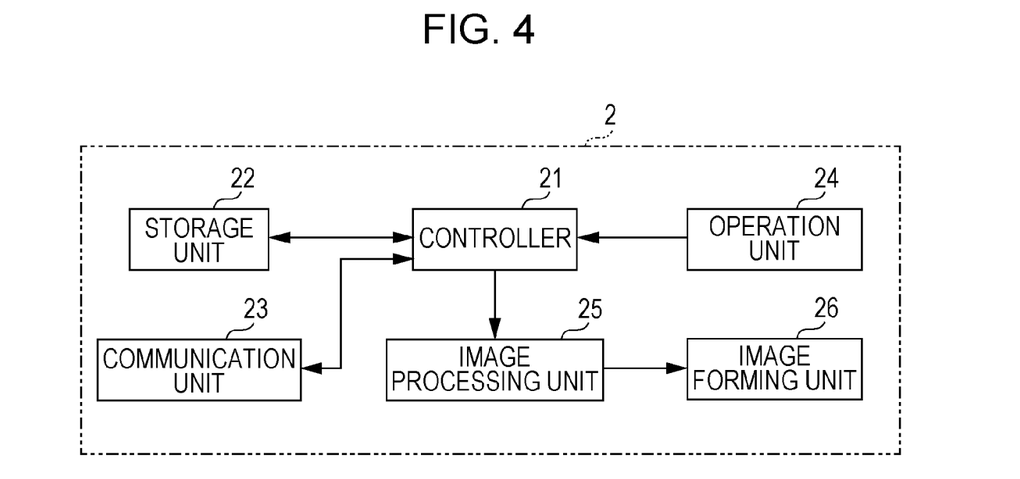
FIG. 4 is a block diagram illustrating a hardware configuration of an image forming apparatus.

FIG. 4 is a block diagram illustrating a hardware configuration of the image forming apparatus 2. As illustrated in FIG. 4, the image forming apparatus 2 includes a controller 21, a storage unit 22, a communication unit 23, an operation unit 24, an image processing unit 25, and an image forming unit 26. The controller 21 includes a CPU, a ROM, and a RAM. The CPU executes a program stored in the ROM or the storage unit 22 so as to control each of the units in the image forming apparatus 2. The storage unit 22 is a storage device such as an HDD, and stores image data and programs, for example. The storage unit 22 also stores a print-data management table TBL2. The data configuration of the print-data management table TBL2 is the same as that of the print-data management table TBL1 stored in the image processing apparatus 1, and will not be described. When the controller 21 receives the print-data-related information from the image processing apparatus 1, the controller 21 registers the information in the print-data management table TBL2.

The communication unit 23 includes an interface card so as to communicate with external apparatuses. The operation unit 24 includes operation keys and a touch panel, and outputs a signal according to a user operation to the controller 21. The image processing unit 25 includes an integrated circuit such as an application specific integrated circuit (ASIC), and an image memory, stores, into the image memory, image data that is output from the controller 21, and performs image processing on the image data. The image processing unit 25 performs a gradation correction process, for example. This gradation correction process is a process in which the gradation characteristics of an image represented by the image data are adjusted. The image processing unit 25 refers to a gradation correction table stored in the storage unit 22 in advance, and converts the gradation value of the image data into a gradation value which is a corresponding value in the gradation correction table.

The image processing unit 25 may perform other types of image processing, such as a shading correction process and a screen process, in addition to the gradation correction process.

The image processing unit 25 is an example of an "operating section" or a "density-changing section" according to an exemplary embodiment of the invention.

The image forming unit 26 forms an image by using an electrophotographic process in accordance with the image data that is output from the image processing unit 25. The image forming unit 26 forms an image on a recording medium by using four colors of toners: yellow (Y), magenta (M), cyan (C), and black (K). This recording medium is, for example, recording paper or a plastic sheet such as an overhead projector (OHP) sheet. The recording medium is an example of a "medium" according to an exemplary embodiment of the invention.

Figure 5:
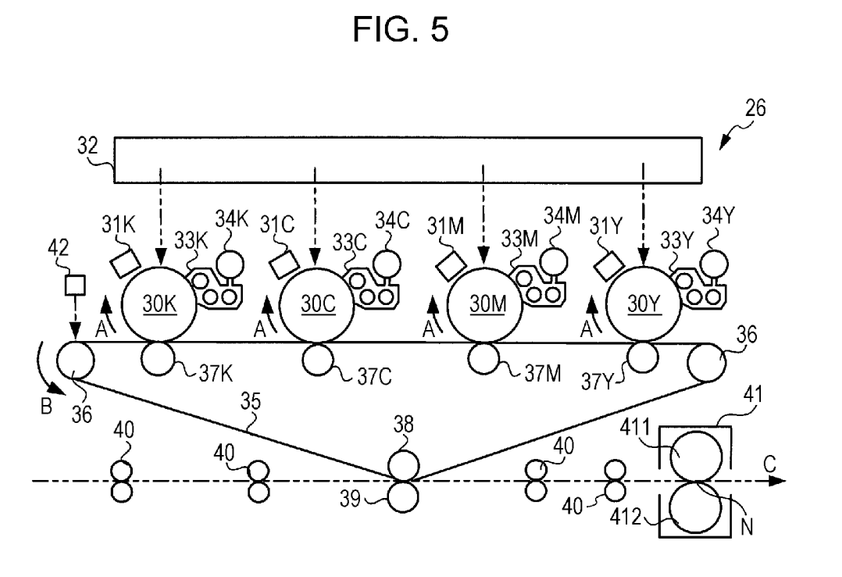
FIG. 5 is a diagram illustrating a configuration of an image forming unit.

FIG. 5 is a diagram illustrating a configuration of the image forming unit 26. In FIG. 5, an alphabet character added to a reference numeral represents the color of a toner that is used by a component denoted by the reference numeral. Components that are denoted by the same reference numeral with different alphabet characters being added to the reference numeral have the same configuration but use different toner colors. In the description below, when these components are not necessarily specified, no alphabet characters will be added to the reference numeral.

In FIG. 5, a recording medium to be transported in the image forming unit 26 is picked up from a paper feed unit (not illustrated), and is transported in the arrow C direction which is represented by the long dashed double-short dashed line. During the transportation, an image is formed on the surface of the recording medium. The image forming unit 26 may have multiple paper feed units, each of which may store a different kind of recording medium.

Photoconductor drums 30 are cylindrical members in which a photoconductive film is stacked on the outer surface of each of the cylindrical members, and are rotatably supported. The photoconductor drums 30 are disposed so as to be in contact with an intermediate transfer belt 35, and rotate in the arrow A direction illustrated in FIG. 5 about the center of the cylindrical shape due to the movement of the intermediate transfer belt 35. The photoconductor drums 30 are an example of an "image holder" according to an exemplary embodiment of the invention.

Charging devices 31 are, for example, scorotrons, and charge the photoconductive films of the photoconductor drums 30 up to a predetermined potential. The charging devices 31 are an example of a "charging section" according to an exemplary embodiment of the invention. An exposure device 32 exposes the photoconductor drums 30 which have been charged by the charging devices 31, and forms electrostatic latent images corresponding to the exposure light. The exposure device 32 performs the exposure in accordance with the image data that is output from the controller 21. The exposure device 32 is an example of an "exposure section" according to an exemplary embodiment of the invention.

Developing devices 33 contain a two-component developer having a toner corresponding to any one of the colors of Y, M, C, and K, and a magnetic carrier such as ferrite powder. The developing devices 33 attach the toner to the electrostatic latent images formed on the photoconductor drums 30 so as to form toner images. The toner images are an example of an "image" according to an exemplary embodiment of the invention. Each of the developing devices 33 is connected to a toner cartridge 34 via a toner supply path, and is supplied with the toner from the toner cartridge 34 by using rotary drive from a dispenser motor (not illustrated). The number of rotation of the dispenser motor is controlled by the controller 21 in accordance with a toner amount to be supplied. The developing device 33 is an example of a "developing section" according to an exemplary embodiment of the invention.

The intermediate transfer belt 35 is a member having the shape of an endless belt, and moves around in the arrow B direction illustrated in FIG. 5 while being in contact with rotating rollers 36, first transfer rollers 37, and a backup roller 38. The intermediate transfer belt 35 is an example of a "medium" according to an exemplary embodiment of the invention. The rotating rollers 36 are cylindrical members for supporting the movement of the intermediate transfer belt 35, and rotate about the center of the cylindrical shape. The first transfer rollers 37 are cylindrical members that each face a corresponding one of the photoconductor drums 30 with the intermediate transfer belt 35 interposed therebetween. The first transfer rollers 37 transfer the toner images formed on the surface of the photoconductor drums 30, onto the surface of the intermediate transfer belt 35 by generating a potential difference between the photoconductor drums 30 and the first transfer rollers 37. The first transfer rollers 37 are an example of a "transfer section" according to an exemplary embodiment of the invention.

A second transfer roller 39 is a cylindrical member that faces the backup roller 38 with the intermediate transfer belt 35 interposed therebetween, and transfers the toner images formed on the surface of the intermediate transfer belt 35, onto the recording medium by generating a potential difference between the backup roller 38 and the second transfer roller 39. The second transfer roller 39 is an example of a "transfer section" according to an exemplary embodiment of the invention.

Transporting rollers 40 are cylindrical members that are driven by a drive device (not illustrated) and that transport the recording medium in the arrow C direction which is represented by the long dashed double-short dashed line illustrated in FIG. 5. The transporting rollers 40 are rotated so as to transport the recording medium at a predetermined transporting speed.

A fixing device 41 includes a fixing roller 411 and a pressurization roller 412. The fixing device 41 performs a fixing process on the recording medium, which has a toner image transferred thereon and is transported, by applying heat and pressure in a region N that is a region between the fixing roller 411 and the pressurization roller 412. Thus, the toner image is fixed onto the recording medium.

A density sensor 42 is a unit for optically reading a toner image formed on the intermediate transfer belt 35. When the density sensor 42 reads the toner image formed on the intermediate transfer belt 35, the density sensor 42 outputs a signal that indicates a density of the toner image which has been read, to the controller 21. The density of a toner image is obtained by dividing the amount of light emitted by the density sensor 42, by the amount of reflected light received by the density sensor 42. This density (optical density) is an example of a "density" according to an exemplary embodiment of the invention.

The density sensor 42 may be disposed so as to read a toner image formed on the photoconductor drums 30 or a toner image formed on the recording medium.

The configuration of the image forming unit 26 has been described above.

Figure 6:
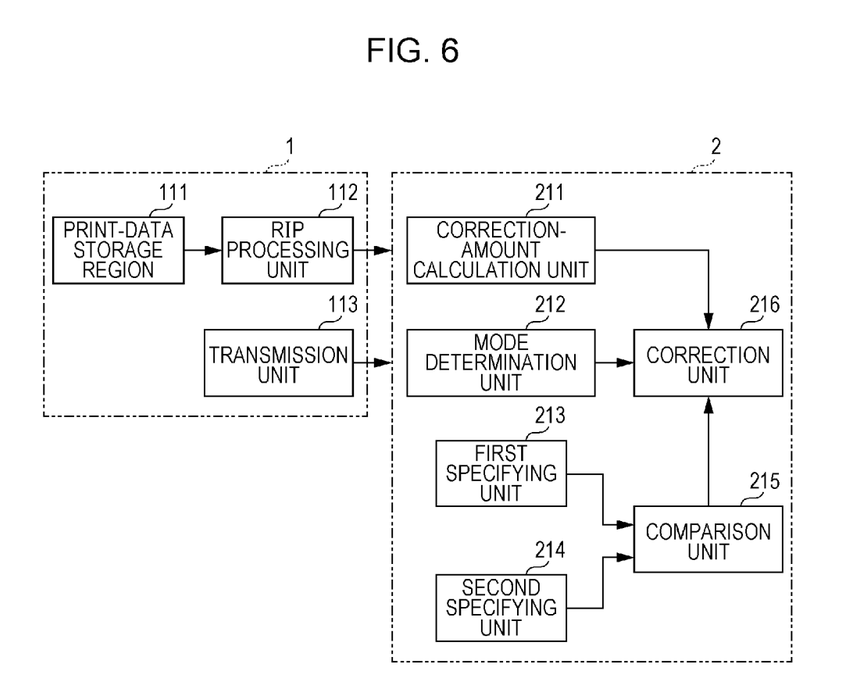
FIG. 6 is a functional block diagram of the image forming system.

Now, a functional configuration of the image forming system according to the exemplary embodiment will be described. FIG. 6 is a functional block diagram illustrating the functional configuration. In the functional configuration, the functions of the image processing apparatus 1 are realized by the CPU executing an image processing program stored in the ROM in the controller 11. The functions of the image forming apparatus 2 are realized by the CPU executing a setup processing program stored in the ROM in the controller 21. The functional configuration is mainly related to a setup process executed in the image forming apparatus 2.

A print-data storage region 111 is a region for temporarily storing the print data in sequence which is transmitted from a client terminal and which is to be subjected to raster image processing (RIP) described below. The print data includes image data described in a page description language (PDL) (hereinafter, referred to as "PDL data") and print control information. The print control information includes the number of copies to be printed for each of the images to be formed, and a paper-feed unit number.

An RIP processing unit 112 reads out PDL data from the print data stored in the print-data storage region 111, interprets the PDL data, and generates raster data on a page-by-page basis. The raster data generated by the RIP processing unit 112 is transmitted to the image forming apparatus 2 via the communication line 3 along with a print data ID and a page number.

A transmission unit 113 transmits the print-data-related information registered in the print-data management table TBL1 to the image forming apparatus 2. For example, the transmission unit 113 transmits the print-data-related information corresponding to the PDL data to the image forming apparatus 2 in synchronization with the readout of the PDL data performed by the RIP processing unit 112.

A correction-amount calculation unit 211 calculates a correction amount that is used when the gradation correction table stored in the storage unit 22 is being corrected. Specifically, the correction-amount calculation unit 211 first instructs the image forming unit 26 to form a patch image. The correction-amount calculation unit 211 then instructs the density sensor 42 to read the generated patch image. When the correction-amount calculation unit 211 receives a signal from the density sensor 42, the correction-amount calculation unit 211 compares the density value indicated by the signal and the predetermined target density value, and calculates the difference between these density values, i.e., a correction amount. The correction-amount calculation unit 211 is an example of a "calculating section" according to an exemplary embodiment of the invention.

A mode determination unit 212 determines an execution mode for the setup process which is currently selected in the image forming apparatus 2. According to the exemplary embodiment, description will be made using a "continuity-prioritized mode" and a "normal mode" as the execution mode. However, other modes such as an "energy-saving mode" may be used as the execution mode. The continuity-prioritized mode is a mode in which priority is placed on continuity in image density of images which have the same image data and which are continuously formed. In the case where this mode is selected, when the setup process is to be performed during the continuous formation of images having the same image data, the correction amount used in the setup process is limited. On the other hand, the normal mode is a mode in which no consideration is given to continuity in density of images. In the case where this mode is selected, even when images having the same image data are being continuously formed, the correction amount used in the setup process is not limited.

The execution mode for the setup process is selected by a user using the operation unit 24, for example, and data indicating the selected execution mode is stored in the storage unit 22. A signal indicating the determination result obtained by the mode determination unit 212 is output to a correction unit 216 described below.

A first specifying unit 213 specifies the image ID of the image data that is being subjected to the image processing performed by the image processing unit 25. For example, the first specifying unit 213 specifies the image ID corresponding to the image data that is output to the image processing unit 25, from the print-data management table TBL2 in accordance with the print data ID and the page number corresponding to the image data. The image ID is an example of "identification information" according to an exemplary embodiment of the invention.

A second specifying unit 214 specifies the image ID of the image data that is to be subjected to the image processing performed by the image processing unit 25 subsequent to the image data denoted by the image ID specified by the first specifying unit 213. Specifically, the second specifying unit 214 specifies the image ID registered in the print-data management table TBL2 as an image ID that follows the image ID specified by the first specifying unit 213.

A comparison unit 215 compares the image ID specified by the first specifying unit 213 with the image ID specified by the second specifying unit 214, and then outputs a signal indicating the comparison result to the correction unit 216.

The correction unit 216 corrects the gradation correction table stored in the storage unit 22 in accordance with the following information: the signal that is output from the comparison unit 215; the correction amount that is calculated by the correction-amount calculation unit 211; and the signal that is output from the mode determination unit 212. Specifically, in the case where the determination result obtained by the mode determination unit 212 indicates that the normal mode is selected, the correction unit 216 corrects the gradation correction table by using the correction amount calculated by the correction-amount calculation unit 211.

In the case where the determination result obtained by the mode determination unit 212 indicates that the continuity-prioritized mode is selected and where the comparison result obtained by the comparison unit 215 indicates that the image IDs which have been compared with each other are different, the correction unit 216 corrects the gradation correction table by using the correction amount calculated by the correction-amount calculation unit 211. In the case where the determination result obtained by the mode determination unit 212 indicates that the continuity-prioritized mode is selected and where the comparison result obtained by the comparison unit 215 indicates that the image IDs which have been compared with each other are the same, the correction unit 216 corrects the gradation correction table by using 50% of the correction amount calculated by the correction-amount calculation unit 211.

The correction unit 216 corrects the gradation correction table at a time point after the image data specified by the first specifying unit 213 is subjected to the image processing performed by the image processing unit 25 and before the image data specified by the second specifying unit 214 is subjected to the image processing performed by the image processing unit 25.

The correction unit 216 is an example of a "correction section" according to an exemplary embodiment of the invention.

Figure 7:
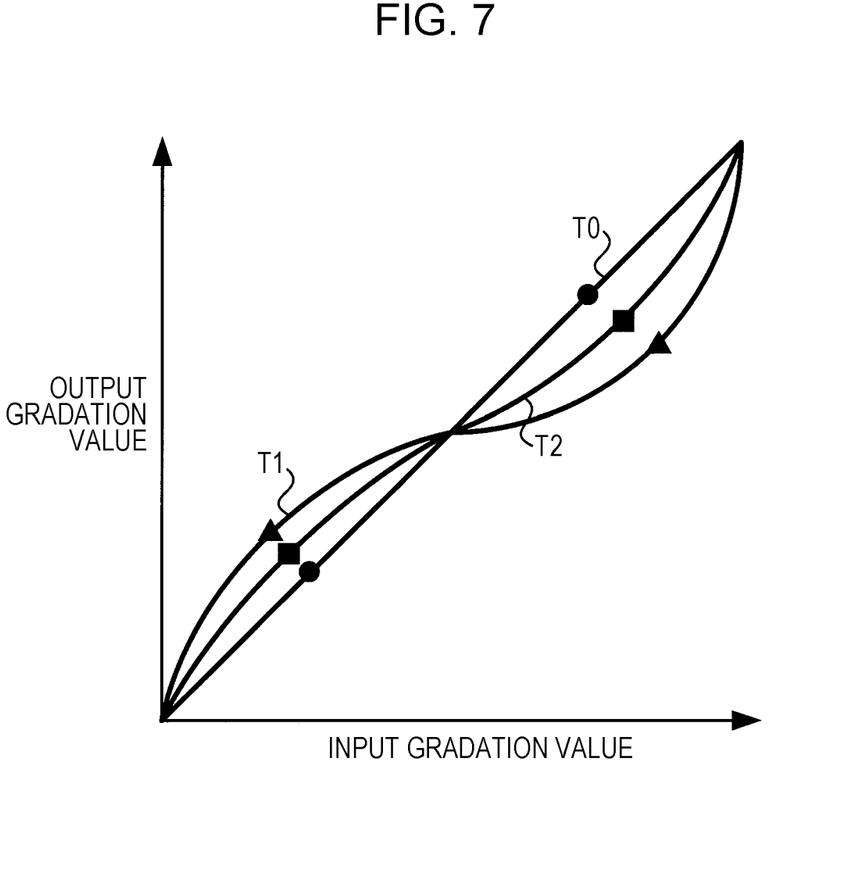
FIG. 7 is a graph describing an exemplary gradation correction table.

FIG. 7 is a graph describing an exemplary gradation correction table which is corrected by the correction unit 216. In FIG. 7, the horizontal axis represents an input gradation value, and the vertical axis represents an output gradation value. In FIG. 7, a line T0 represents target-density gradation characteristics, a line T1 represents density gradation characteristics obtained when the density gradation characteristics are corrected by using the correction amount calculated by the correction-amount calculation unit 211, and a line T2 represents density gradation characteristics obtained when the density gradation characteristics are corrected by using 50% of the correction amount.

It is noted that the reduction amount used when the correction amount is to be reduced is not limited to 50%, and may be 30% or 70%, for example. An alternative method for reducing the correction amount may be employed in which an absolute value of the correction amount that is used for the correction at a time is limited to a threshold or below.

The functional configuration of the image forming system according to the exemplary embodiment has been described above.

(1-2) Operation

Figure 8:
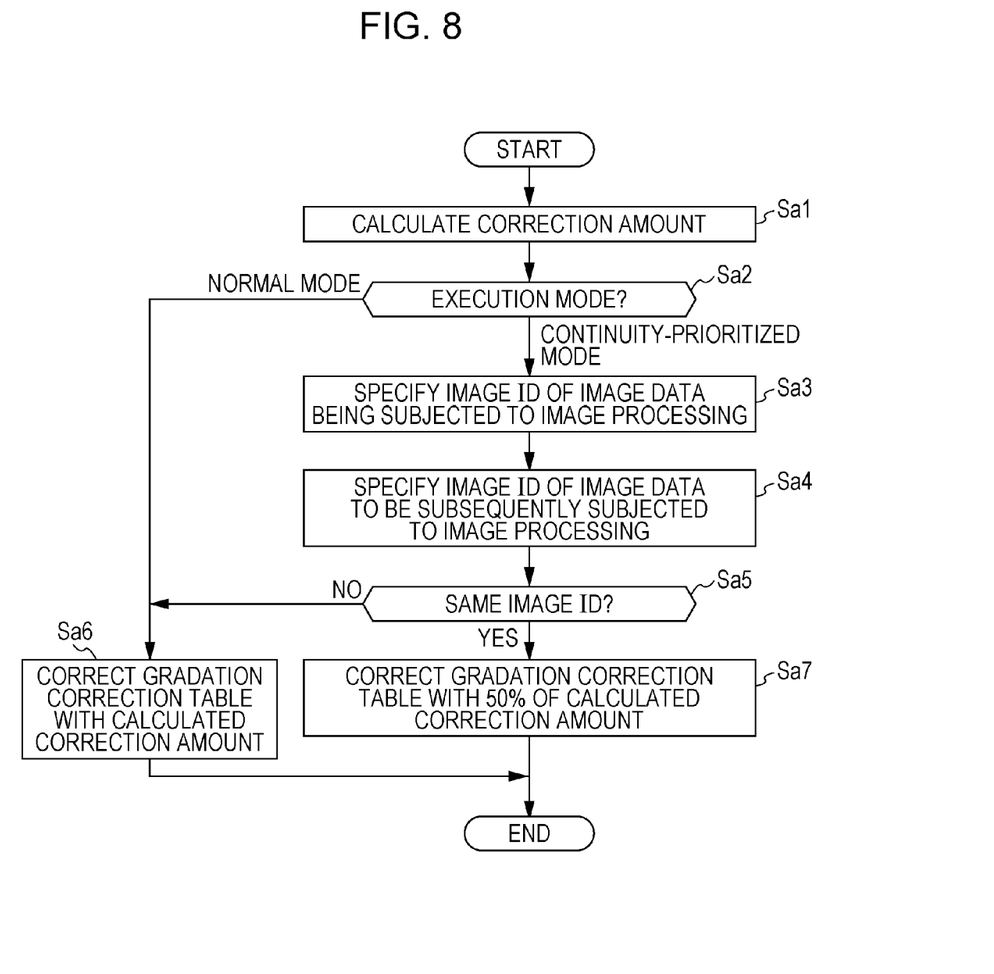
FIG. 8 is a flowchart of a setup process according to one exemplary embodiment.

Now, the setup process performed by the image forming apparatus 2 according to the exemplary embodiment will be described. FIG. 8 is a flowchart of the setup process. This setup process is performed by the CPU executing a program for the setup process which is stored in the ROM in the image forming apparatus 2. Specifically, the setup process is performed when images have been formed on a predetermined number of sheets of a recording medium (for example, 100 sheets) or when a predetermined time period has elapsed. The setup process may be performed in parallel with the image forming process performed by the image forming unit 26, and may be performed for each developing device 33 using a corresponding color.

In step Sa1, the controller 21 calculates a correction amount to be used when the gradation correction table stored in the storage unit 22 is corrected. Specifically, the controller 21 causes the image forming unit 26 to form a patch image and causes the density sensor 42 to read the patch image. The controller 21 then compares the density value indicated by a signal that is output from the density sensor 42 with the target density value, and calculates the difference between these density values, i.e., a correction amount.

In step Sa2, the controller 21 determines an execution mode for the setup process which is currently selected in the image forming apparatus 2. If the determination result indicates that the continuity-prioritized mode is selected (continuity-prioritized mode in step Sa2), the controller 21 performs step Sa3. If the normal mode is selected (normal mode in step Sa2), the controller 21 performs step Sa6.

In step Sa3, the controller 21 specifies the image ID of image data that is being subjected to the image processing performed by the image processing unit 25.

In step Sa4, the controller 21 then specifies the image ID registered in the print-data management table TBL2 as an image ID that follows the image ID specified in step Sa3.

In step Sa5, the controller 21 compares the image ID specified in step Sa3 and the image ID specified in step Sa4.

If the comparison result indicates that the image IDs are different, in other words, the image that is being subjected to the image processing is not the same as the image that is to be subsequently subjected to the image processing (NO in step Sa5), the controller 21 corrects the gradation correction table with the correction amount calculated in step Sa1 (step Sa6). If the comparison result indicates that the image IDs are the same, in other words, the image that is being subjected to the image processing is the same as the image that is to be subsequently subjected to the image processing (YES in step Sa5), the controller 21 corrects the gradation correction table with 50% of the correction amount calculated in step Sa1 (step Sa7).

The setup process according to the exemplary embodiment performs operations as described above.

Figure 9:
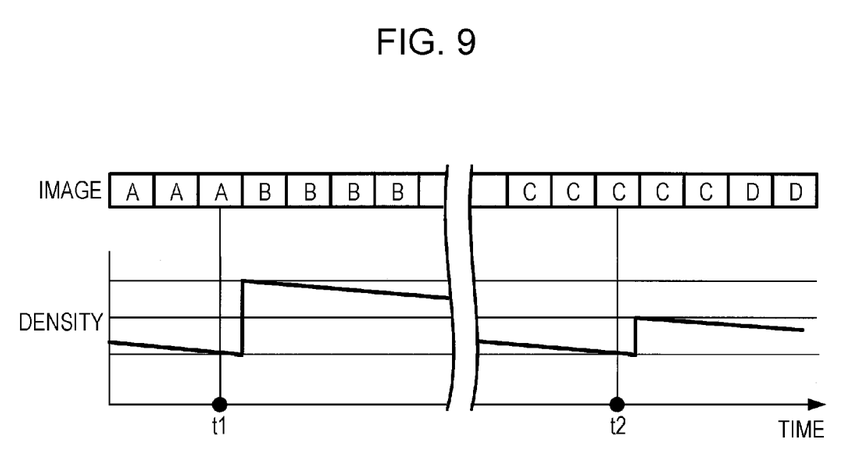
FIG. 9 is a timing chart illustrating exemplary changes in density which occur when a setup process is performed.

FIG. 9 is a timing chart illustrating exemplary changes in density which occur when the setup process is performed. In FIG. 9, the horizontal axis represents time, and the vertical axis represents density. "Image" in FIG. 9 represents a sequence of images that are subjected to the image processing performed by the image processing unit 25. The description below will be made under the assumption that the continuity-prioritized mode is selected.

In the example illustrated in FIG. 9, assuming that the setup timing has come at time t1, an image "A" is being subjected to the image processing at this time point, and an image "B" is to be subsequently subjected to the image processing. In this case, these images are different. Accordingly, the correction amount calculated by the controller 21 is used as is to correct the gradation correction table.

Assuming that the setup timing has come at time t2, an image "C" is being subjected to the image processing at this time point, and an image "C" is to be subsequently subjected to the image processing. In this case, these images are the same. Accordingly, 50% of the correction amount calculated by the controller 21 is used to correct the gradation correction table.

Exemplary changes in density which occur when the setup process according to the exemplary embodiment is performed have been described above.

In the setup process according to the exemplary embodiment, when the timing at which the setup process is to be performed has come during sequential formation of images that are different to each other, a correction is made so that the density value of images that are to be formed is changed back to the target density value. On the other hand, when the timing at which the setup process is to be performed has come during sequential formation of the same images, no correction is made which causes the density value of images to be changed back to the target density value, and the correction amount is limited to a predetermined amount. Accordingly, the difference in density between images formed before and after the execution of the setup process is reduced.

(2) Modified Exemplary Embodiment

The above-described exemplary embodiment may be modified as described below. The modified exemplary embodiments described below may be combined with one another.

(2-1) First Modified Exemplary Embodiment

In the above-described exemplary embodiment, when the setup timing has come during sequential formation of the same images, a correction amount to be used when the gradation correction table is corrected is limited. The remaining correction amount that has not been used for the correction for the gradation correction table may be used to correct the gradation correction table at later timings. For example, in step Sa7 of the above-described setup process, the controller 21 of the image forming apparatus 2 may divide the calculated correction amount into a predetermined number of correction amounts. The controller 21 may first correct the gradation correction table with one of the predetermined number of correction amounts, and then correct the gradation correction table with each of the remaining correction amounts at predetermined time intervals. Instead, the controller 21 may first correct the gradation correction table with an amount which is part of the calculated correction amount and which corresponds to a predetermined threshold, and then correct the gradation correction table with an amount, which corresponds to the threshold, at predetermined time intervals until the whole calculated correction amount is used for the correction.

Figure 10:
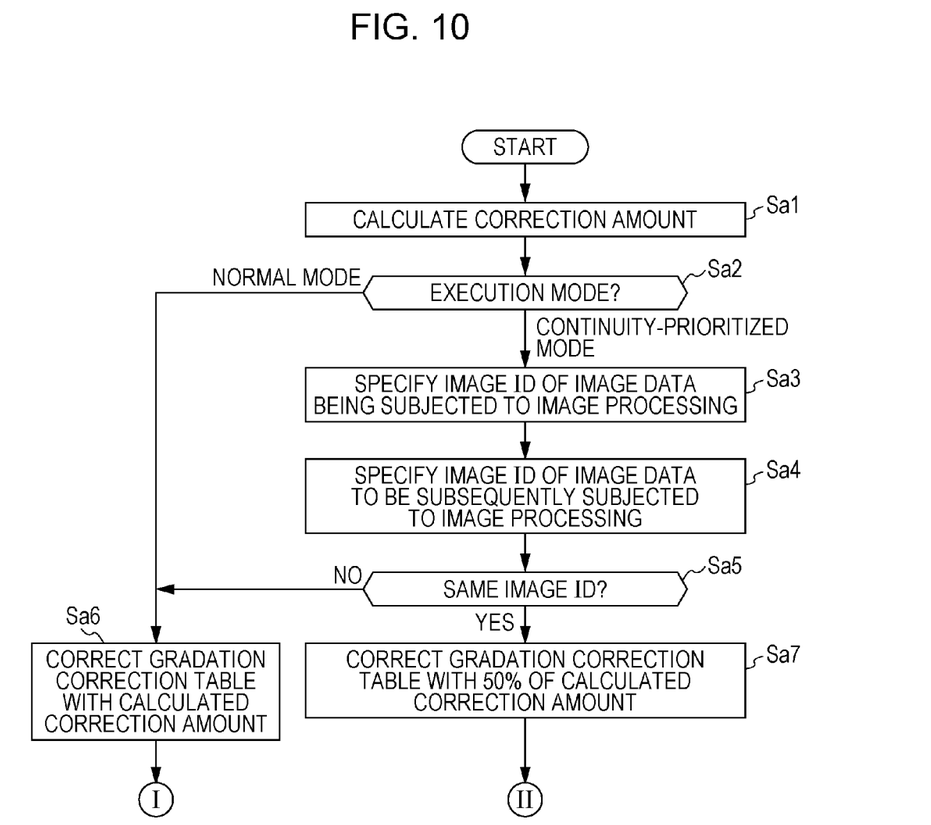
FIG. 10 is a flowchart of a setup process according to a modified exemplary embodiment.
Figure 11:
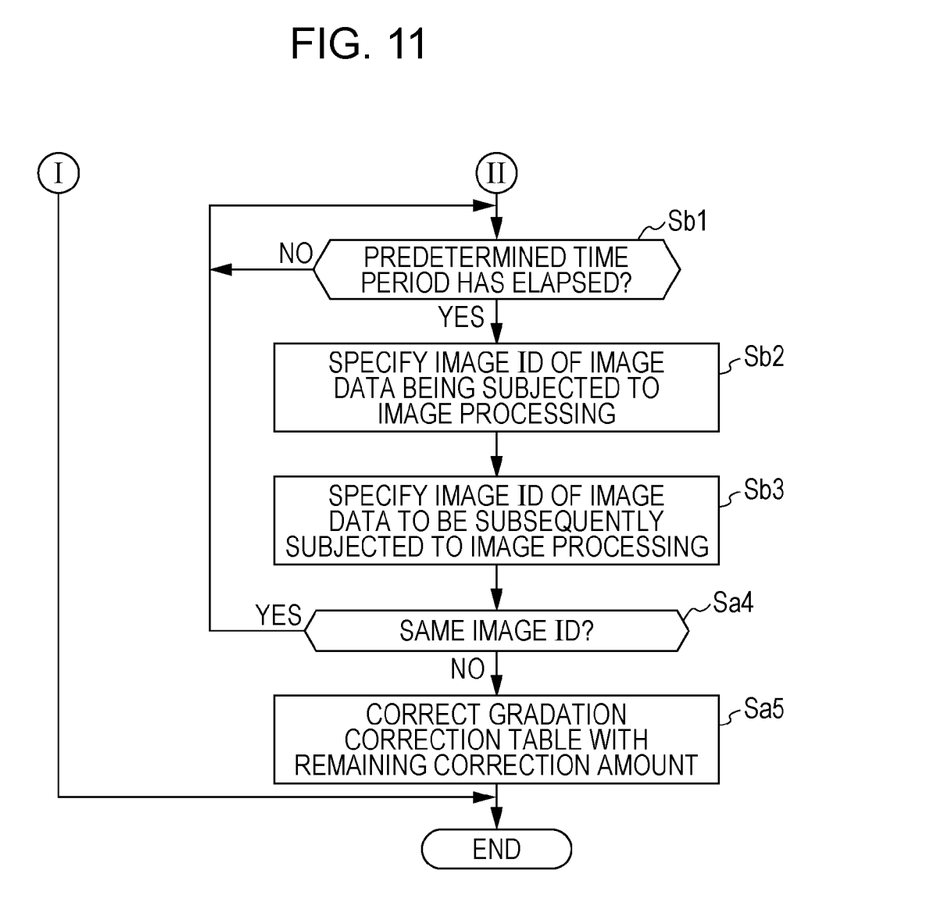
FIG. 11 is a flowchart of the setup process according to the modified exemplary embodiment.

A timing for correction with the correction amount that has not been used to correct the gradation correction table may be defined as a time point at which the same images are not sequentially formed. FIGS. 10 and 11 are flowcharts of a setup process according to this modified exemplary embodiment.

In FIG. 10, steps Sa1 to Sa1 are similar to those of the setup process according to the above-described exemplary embodiment, and will not be described.

In step Sb1 in FIG. 11, the controller 21 determines whether a predetermined time period has elapsed. If the determination result indicates that the predetermined time period has not elapsed (NO in step Sb1), the controller 21 performs step Sb1 again. If the predetermined time period has elapsed (YES in step Sb1), the controller 21 specifies the image ID of image data that is being subjected to the image processing performed by the image processing unit 25 (step Sb2). In step Sb3, the controller 21 then specifies the image ID registered in the print-data management table TBL2 as an image ID that follows the image ID specified in step Sb2. In step Sb4, the controller 21 compares the image ID specified in step Sb2 and the image ID specified in step Sb3.

If the comparison result indicates that the image IDs are the same (YES in step Sb4), the controller 21 performs step Sb1 again. If the image IDs are not the same (NO in step Sb4), the controller 21 corrects the gradation correction table with the remaining correction amount that has not been used for the correction in step Sa1 (step Sb5).

The setup process according to the modified exemplary embodiment performs operations as described above.

(2-2) Second Modified Exemplary Embodiment

According to the above-described exemplary embodiment, a comparison is made between the image ID of image data that is being subjected to the image processing performed by the image processing unit 25 at the timing at which the setup process is to be performed, and the image ID of image data that is to be subsequently subjected to the image processing. When these image IDs are the same, the correction amount to be used to correct the gradation correction table is limited. In other words, in the case where an image that is being subjected to the image processing at the timing at which the setup process is to be performed is the same as an image that is to be subsequently subjected to the image processing, the correction amount is limited. However, the limitation of the correction amount is not limited to when images are the same.

For example, when the same kind of recording medium on which an image is formed is used, the correction amount may be limited. More specifically, when the numbers corresponding to the paper feed units that store recording media on which images are formed are the same, the correction amount may be limited. In this case, the controller 21 specifies the paper-feed unit numbers instead of the image IDs in steps Sa3 and Sa4 in the above-described setup process, and compares these paper-feed unit numbers in step Sa5.

Instead, in the above-described exemplary embodiment, when the client terminals that request formation of images are the same, the correction amount may be limited. More specifically, when the terminal IDs of client terminals that request formation of images are the same, the correction amount may be limited. In this case, the controller 21 specifies the terminal IDs instead of the image IDs in steps Sa3 and Sa4 in the above-described setup process, and compares these terminal IDs in step Sa5.

In this modified exemplary embodiment, the terminal ID may be replaced with the ID of a user who uses the client terminal.

The paper-feed unit number, the terminal ID, and the user ID described above are examples of "identification information" according to an exemplary embodiment of the invention.

(2-3) Third Modified Exemplary Embodiment

According to the above-described exemplary embodiment, the gradation correction table is corrected to cause a change in the density of images that are to be formed. However, an object to be corrected may be other than the gradation correction table. For example, a charging potential used when the charging devices 31 charge the photoconductor drums 30, an exposure amount used in the exposure device 32, a developing bias used in the developing devices 33, or a transfer bias used for the first transfer rollers 37 and the second transfer roller 39 may be corrected.

In this case, when an exposure amount is corrected, for example, the image ID of image data that is being subjected to the exposure process performed by the exposure device 32 is specified in step Sa3 in the above-described setup process. In step Sa4, the image ID of image data that is to be subsequently subjected to the exposure process is specified. In step Sa6 or Sa7, the exposure amount is corrected at a time point after the image specified in step Sa3 is subjected to the exposure process and before the image specified in step Sa4 is subjected to the exposure process.

The charging devices 31, the exposure device 32, the developing devices 33, and the first transfer rollers 37 and the second transfer roller 38 are examples of an "operating section" according to an exemplary embodiment of the invention.

(2-4) Fourth Modified Exemplary Embodiment

According to the above-described exemplary embodiment, a comparison is made between the image ID of image data that is being subjected to the image processing performed by the image processing unit 25 at the timing at which the setup process is to be performed, and the image ID of image data that is to be subsequently subjected to the image processing. When these image IDs are the same, the correction amount to be used to correct the gradation correction table is limited. However, the image ID that is compared with the former image ID that is being subjected to the image processing is not limited to the ID of the image that is to be subjected to the image processing just after the image represented by the former image ID. For example, the former image ID may be compared with the image IDs of two images that are to be subjected to the image processing subsequent to the image represented by the former image ID. When at least one of the image IDs of the two images is the same as the former image ID, the correction amount to be used to correct the gradation correction table may be limited. In this case, the number of image IDs that are compared with the former image ID is not limited to two, and may be three or more. Additionally, in this case, the number of images having the same image ID as the former image ID, which is used when it is determined whether the correction amount is to be limited, is not limited to "at least one", and may be "at least two" or more.

(2-5) Fifth Modified Exemplary Embodiment

According to the above-described exemplary embodiment, it is assumed that the setup process is performed when a predetermined number of sheets of a recording medium have been used to form images or when a predetermined time period has elapsed. However, in the above-described exemplary embodiment, when the correction amount to be used to correct the gradation correction table is limited, the timing at which the setup process is to be performed may be set earlier.

Specifically, when the correction amount to be used to correct the gradation correction table is limited, for example, the controller 21 may set the value that represents the timing at which the setup process is to be performed, to a value that is smaller than a normal value. When the correction amount is not limited, the controller 21 may set the timing value to the normal value or maintain the timing value at the normal value.

(2-6) Sixth Modified Exemplary Embodiment

According to the above-described exemplary embodiment, when the setup process is performed, the execution mode for the setup process is determined. When the determination result indicates that the continuity-prioritized mode is selected, a comparison is made between the image ID of image data that is being subjected to the image processing performed by the image processing unit 25 and the image ID of image data that is to be subsequently subjected to the image processing. When these image IDs are the same, the correction amount to be used to correct the gradation correction table is limited. However, in the above-described exemplary embodiment, when the continuity-prioritized mode is selected, the correction amount may be limited without determination of whether the image IDs are the same. Specifically, in the flowchart in FIG. 8, when the determination result in step Sa2 indicates that the continuity-prioritized mode is selected, the controller 21 may perform step Sa7.

According to the above-described exemplary embodiment, the execution mode for the setup process is selected by a user using the operation unit 24, for example, and data indicating the selected execution mode is stored in the storage unit 22. This data indicating the execution mode may be set for each page on which an image is formed, and the data may be used to determine whether the correction amount is to be limited. For example, in the above-described exemplary embodiment, the controller 21 may perform step Sa1 in FIG. 8, and then specify the data which indicates the execution mode and which corresponds to the image data that is being subjected to the image processing performed by the image processing unit 25. When the data indicates that the normal mode is selected, the controller 21 may perform step Sa6. When the data indicates that continuity-prioritized mode is selected, the controller 21 may perform step Sa7. The data indicating the execution mode in this case may be, for example, transmitted as print control information from the image processing apparatus 1, and registered in the print-data management table TBL2 stored in the storage unit 22. The data indicating the execution mode may be set for each group of print data, not for each page on which an image is formed.

(2-7) Seventh Modified Exemplary Embodiment

According to the above-described exemplary embodiment, a program for the setup process, which is executed by the CPU in the image forming apparatus 2, may be provided in a state that a storage medium, such as a magnetic tape, a magnetic disk, a flexible disk, an optical disk, a magneto-optical disk, or a memory, stores the program, and may be installed in the image forming apparatus 2. This program may be downloaded into the image forming apparatus 2 via a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A correction apparatus comprising:
    an operating section that performs an operation for forming an image having a predetermined density;
    a calculating section that calculates a first correction amount that is a correction amount used when a value of the predetermined density is to be corrected; and
    a correction section that corrects the value of the predetermined density in such a manner that the correction is performed on the basis of the first correction amount when first identification information corresponding to an image that has been a target of the operation performed by the operating section before the correction performed by the correction section and second identification information corresponding to an image that is to be a target of the operation performed by the operating section after the correction performed by the correction section do not satisfy a predetermined condition, whereas the correction is performed on the basis of a second correction amount that is smaller than the first correction amount, when the first identification information and the second identification information satisfy the predetermined condition.

2. The correction apparatus according to claim 1, wherein when the first identification information and the second identification information satisfy the predetermined condition, the correction section performs the correction on the basis of the second correction amount at a first timing, and corrects the value of the predetermined density that has been corrected on the basis of the second correction amount, on the basis of a value that is equal to or less than a difference between the first and second correction amounts at a second timing after the first timing.

3. The correction apparatus according to claim 2, wherein when third identification information corresponding to an image that has been a target of the operation performed by the operating section before the correction performed at the second timing and fourth identification information corresponding to an image that is to be a target of the operation performed by the operating section after the correction performed at the second timing do not satisfy the predetermined condition, the correction section performs the correction to be performed at the second timing.

4. A non-transitory computer readable medium storing a program causing a computer to execute a process comprising:
performing an operation for forming an image having a predetermined density;
calculating a first correction amount that is a correction amount used when a value of the predetermined density is to be corrected; and
correcting the value of the predetermined density in such a manner that the correcting is performed on the basis of the first correction amount when first identification information corresponding to an image that has been a target of the operation performed by the performing before the correcting and second identification information corresponding to an image that is to be a target of the operation performed by the performing after the correcting do not satisfy a predetermined condition, whereas the correcting is performed on the basis of a second correction amount that is smaller than the first correction amount, when the first identification information and the second identification information satisfy the predetermined condition.

\* \* \* \* \*